United States Patent
Richey, II et al.

(10) Patent No.: US 6,202,773 B1
(45) Date of Patent: Mar. 20, 2001

(54) MOTORIZED WHEELCHAIRS

(75) Inventors: Joseph B. Richey, II, Chagrin Falls; Theodore D. Wakefield, II, Vermilion, both of OH (US)

(73) Assignee: Invacare Corporation, Elyria, OH (US)

(*) Notice: Subject to any disclaimer, the term of this patent is extended or adjusted under 35 U.S.C. 154(b) by 0 days.

(21) Appl. No.: 09/365,276

(22) Filed: Jul. 30, 1999

(51) Int. Cl.$^7$ ..................................... B62D 11/04
(52) U.S. Cl. .................. 180/6.5; 180/907; 280/304.1; 701/72
(58) Field of Search ................ 180/6.2, 6.48, 180/6.5, 907, 65.1; 280/250.1, 304.1; 477/1; 701/41, 42, 72

(56) References Cited

U.S. PATENT DOCUMENTS

| | | | | |
|---|---|---|---|---|
| 4,415,049 | * | 11/1983 | Wereb ..................... | 180/6.5 |
| 4,471,273 | | 9/1984 | Melocik et al. . | |
| 4,511,825 | | 4/1985 | Klimo . | |
| 4,549,624 | * | 10/1985 | Doman ..................... | 180/6.28 |
| 4,634,941 | * | 1/1987 | Klimo ...................... | 318/139 |
| 5,022,476 | * | 6/1991 | Weege ...................... | 180/6.5 |
| 5,234,066 | * | 8/1993 | Ahsing et al. ............. | 180/6.5 |
| 5,253,724 | * | 10/1993 | Prior ........................ | 180/65 |

FOREIGN PATENT DOCUMENTS

| | | |
|---|---|---|
| 0324101 | 7/1989 | (EP) . |
| 2218517 | 11/1989 | (GB) . |
| 10314234 | 12/1998 | (JP) . |
| 94 20325 | 9/1994 | (WO) . |

OTHER PUBLICATIONS

Cooper, R.A. "Intelligent Control Of Power Wheelchairs", I.E.E.E. Engineering in Medicine & Biology Magazine, vol. 14, No. 4, Jul./Aug. 1995, pp. 423–430, New York, U.S.

* cited by examiner

*Primary Examiner*—Brian L. Johnson
*Assistant Examiner*—Avraham H. Lerner
(74) *Attorney, Agent, or Firm*—Hudak & Shunk Co., L.P.A.

(57) ABSTRACT

A motorized wheelchair is advantageously provided with a rate-of-turn feedback sensor and with forward/reverse motion, lateral motion, and vertical motion acceleration feedback sensors that are integrated into a closed-loop wheelchair servo control system to differentially control the rotational speed of wheelchair opposed motor-driven wheels and thereby obtain improved wheelchair motion stability through reduction/elimination of likely wheelchair spin-out and wheelchair tipping during wheelchair operation.

10 Claims, 2 Drawing Sheets

MOTORIZED WHEELCHAIRS

FIELD OF INVENTION

The present invention relates generally to motorized wheelchairs, and particularly concerns a wheelchair stability control system that advantageously and significantly reduces wheelchair tendencies toward veering and/or tipping during wheelchair operation.

BACKGROUND OF THE INVENTION

Motorized wheelchairs with differential steering tend to be difficult to control. The wheelchair short wheelbase and narrow track necessary for maneuverability in close quarters makes it difficult to achieve wheelchair stability during operation at relatively high forward velocities. The stability problem is exacerbated in the typical front-wheel drive wheelchair by the use of trailing, freely-swiveling castors. In such wheelchairs the center of gravity is behind the wheelchair drive wheels and thus the momentum of the moving wheelchair adds to any turning force generated by the drive wheels. Once the front wheels lose traction, the trailing castors allow the wheelchair to spin out of control. In a rear-wheel drive wheelchair, where the center of gravity is ahead of the drive wheels the inertia of the wheelchair opposes turning forces generated by the drive wheels.

Also, in front-wheel drive wheelchairs the center of gravity with the occupant included is generally positioned at a level that is above the level of the drive wheel axis of rotation, and thus braking forces generated at the drive wheels during wheelchair forward motion, when combined with the momentum forces acting through the center of gravity, create wheelchair forward tipping moments which further contribute to wheelchair motion instability.

A typical maximum stable speed for rear-wheel drive wheelchairs is about 7+ miles per hour. The typical maximum speed for front-wheel drive wheelchairs is approximately 4 miles per hour if the drive wheel differential speed is monitored with motor current/voltage sensing. If the front drive wheels are monitored with tachometers and/or position sensors, speeds of approximately 5 miles per hour can be achieved. However, in either instance once the wheels start to slip, directional control is lost.

It is possible to further increase the maximum speed to about 6 or 7 miles per hour in a front-wheel drive wheelchair by steering the rear castors, but this approach sacrifices the maneuverability (turning radius) that predicted the selection of front-wheel drive to start. Such wheelchairs are not practical for indoor use.

An additional stability problem with both front-wheel drive and rear-wheel drive power wheelchairs is "veering" when traversing a sloping surface. In those instances there often is a tendency for the wheelchair to uncontrollably turn or "veer". Such can be an instability problem of major magnitude in wheelchairs that use switch-type operator controls.

SUMMARY OF INVENTION

The motorized wheelchair of the present invention includes a wheelchair chassis, a motorized right front-wheel connected to the chassis, a motorized left front-wheel connected to the chassis, and a trailing castor assembly also connected to the chassis. The invention wheelchair further includes an operator input device such as a conventional joystick control that generates, in response to operator manipulation, wheelchair forward/reverse linear velocity commands and wheelchair turn direction/turn rate commands. Also included in the invention wheelchair is a closed-loop servo control system controller subassembly that, in addition to receiving operator input turn and velocity commands, receives operating power from a battery source, and generates and utilizes control system feed-back inputs from included rate-of-turn, forward acceleration, lateral acceleration, and vertical acceleration sensors.

From an operating method standpoint, the wheelchair invention involves the steps of rotating two front wheel drive wheels at equal rates to cause wheelchair forward and/or reverse linear motion in accordance with corresponding input command signals, or differentially in response to wheelchair turn commands, of sensing the wheelchair turn direction and wheelchair turn rate with an angular rate-of-turn sensor, of comparing or summing the sensed wheelchair turn direction and wheelchair turn rate with the system input command turn direction and turn rate, and of differentially altering the motorized wheelchair wheel rotational speeds in response to the comparison step thereby obtaining improved wheelchair motion stability, especially with respect to reduction of wheelchair spin-out or veering tendencies and with respect to reduction of wheelchair tipping tendencies.

DETAILED DESCRIPTION

Figure 1:
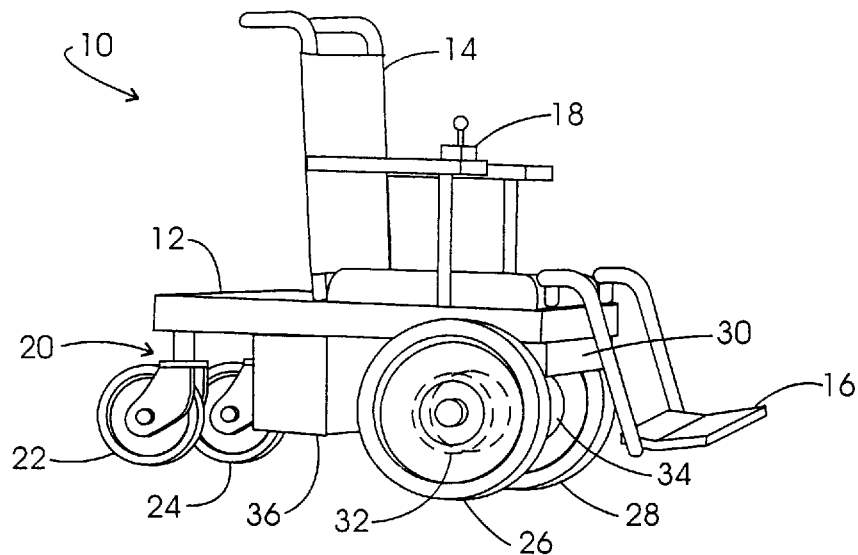
FIG. 1 is a perspective view of a preferred embodiment of the motorized wheelchair system of the present invention.

Referring to FIG. 1, a front-wheel drive motorized wheelchair 10 includes a chassis 12, an occupant seat 14, a footrest 16, an operator input device 18 often having the form of a conventional wheelchair joystick input control, a castor assembly 20 including two freely-swiveling castors 22 and 24, a right driven front-wheel 26, a left driven front-wheel 28, and a controller 30. Operator input control 18 typically outputs a turn direction value voltage signal and separately a linear velocity value voltage signal; such output value voltage signals simultaneously indicate an operator-desired wheelchair angular turn rate command.

The center of gravity of occupied power wheelchair 10 is to the rear of front wheels 26, 28. When wheelchair 10 is in forward motion and starts to turn, its momentum acts through the center of gravity to try to push castor wheels 22, 24 out of track behind front wheels 26, 28. Only as long as front wheels 26, 28 maintain traction do castor wheels 22, 24 stay in track. When a wheel 26 or 28 loses traction, power wheelchair 10 spins out, controller 30 monitors wheelchair turn rate and turn direction and limits wheelchair turn rate to values in the desired direction and less than or equal to the desired turn rate.

Figure 2:
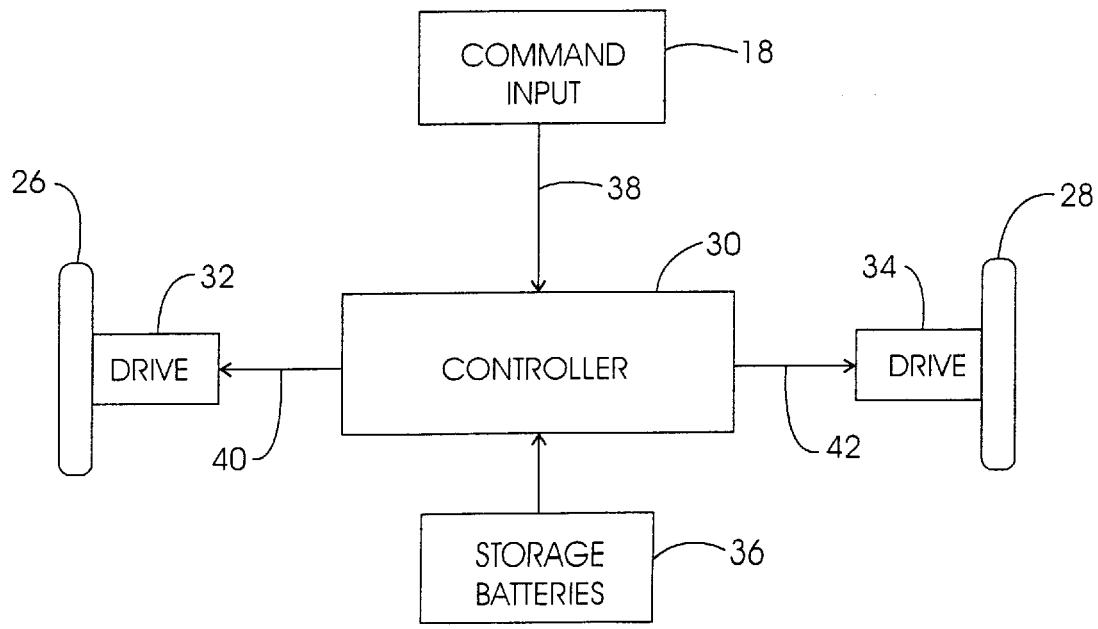
FIG. 2 is a schematic functional block diagram of the wheelchair system of FIG. 1.

Referring to FIG. 2, motorized wheelchair 10 is illustrated with a different type of reversible electrical motor drive for each driven wheel for the sake of completeness. (In practice, only a single type drive would be used on any given wheelchair). Right driven front-wheel 26 is driven by a reversible direct current electrical motor 32 acting through conventional gears and controlled by controller 30. Left driven front-wheel 28 is driven directly by a reversible brushless and gearless motor 34 in response to controller 30.

Power for controller 30 and for reversible drives 32 and 34 is supplied by conventional storage batteries 36. Drives 32 and 34 also provide negative drive, i.e., braking, for front-wheels 26 and 28.

Command input device 18 communicates with controller 30 through conventional electrical control cable 38. Element 18, which may take the form of a conventional joystick-type command input control, is provided as an input device to allow the operator/occupant of power wheelchair 10 to control its movement, including forward, reverse, and/or turning movements. Other types of input device could also be used, for example, a "sip and puff" device or an operator head movement sensor.

Controller subassembly 30 is essentially a digital signal-processor that is integrated into and functions as a closed-loop servo control system, that is mounted on and supported by wheelchair chassis 12, and that effects, in response to commands from operator input device 18, differential speed regulation of wheels 26, 28 via electrical cables 40, 42 for both wheelchair turn motion control and wheelchair linear motion control.

Figure 3:
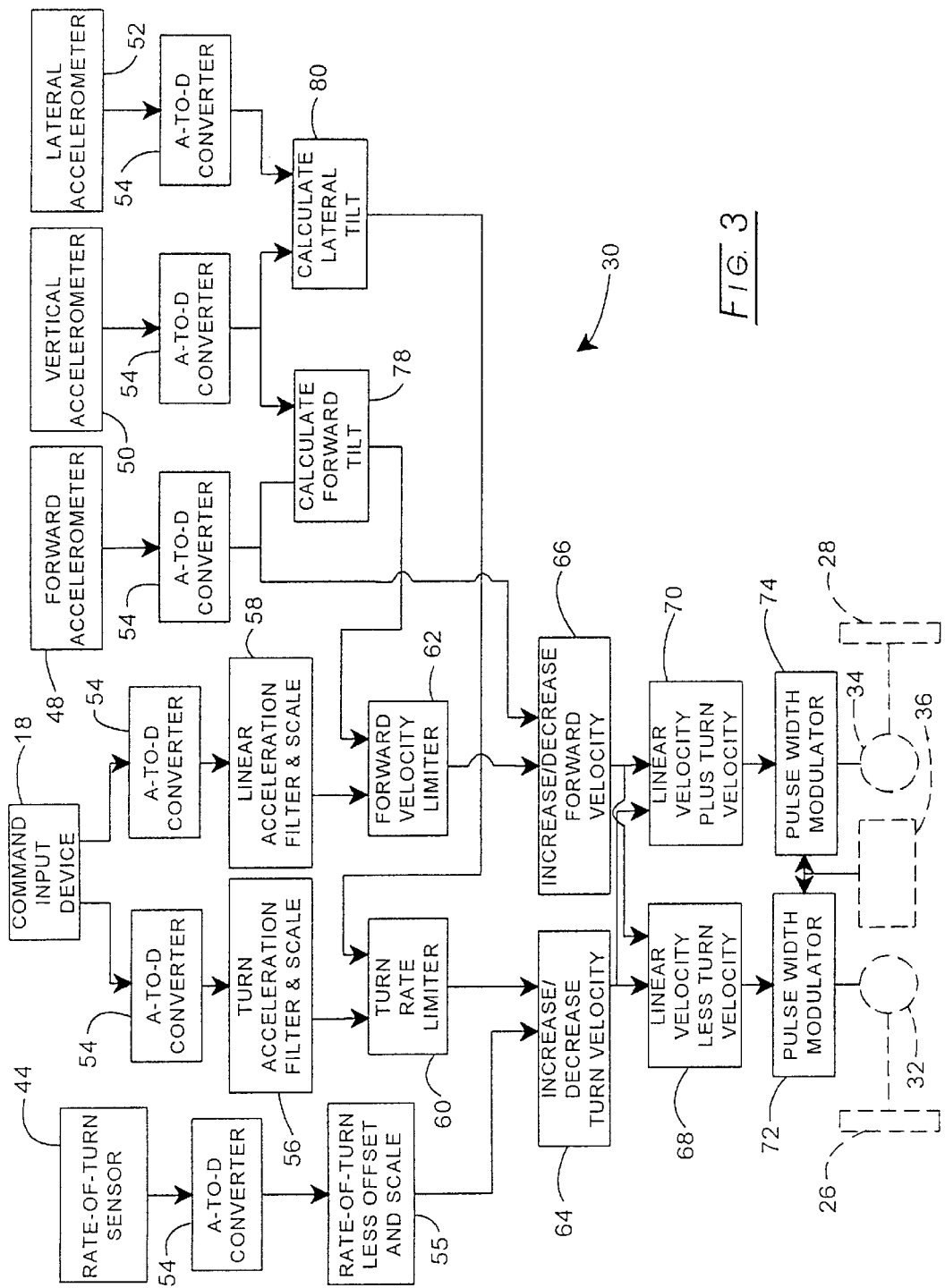
FIG. 3 is a schematic functional block diagram of the wheelchair system closed-loop controller subassembly illustrated in FIG. 2.

Referring to FIG. 3, one important aspect of the present invention is the utilization in controller subassembly 30 of an angular rate-of-turn sensor 44 which may take the form of a piezoelectric ceramic "gyroscope" similar to the Model CG-16D sensor manufactured and sold by Tokin America Corporation, or a conventional actually-rotating gyroscope, or be constructed using properly orthogonally-oriented conventional linear accelerometer devices. In any event, it is preferred that sensor 44 be able to measure wheelchair chassis angular rates of turn of at least 280 degrees per second to correspond to generally-desired wheelchair turning rate capabilities. Such rate of turn sensor can be utilized by itself to control turning of the wheelchair.

The illustrated system input command device 18 and feed-back sensor 44 typically generate analog voltage output signals, and accordingly the output signal of each is processed through an analog to digital converter 54 for subsequent utilization within controller subassembly 30. The sensor 44 signal, subsequent to analog to digital conversion in circuite 54, is filtered in rate-of-turn less offset and scale circuit 55 by a 2.5 second average filter (could be less than 1 second to a few minutes) which is updated only while the wheelchair is not being driven, i.e. a neutral drive command from device 18. The averaged value is the "neutral offset" of rate-of-turn sensor 44. The neutral offset may vary with time or ambient temperature. Specifically, the Model CG-16D sensor neutral offset can vary as much as 180 angular degrees per second over the temperature range of 5 to 75 degrees Celsius. Averaging the sensor output while in neutral removes transient changes in the sensor output introduced by small movements of the wheelchair caused by, for instance, the operator shifting their weight on the seat of the wheelchair. While driving commands are being generated through device 18, the neutral offset is subtracted from the sensor 44 output signal. The remainder is multiplied by a calibration factor which scales the remainder to a one-to-one ratio with the turn command of circuit 60.

It should be noted that circuit 55, as well as other system circuits having a computing function such as those circuits referenced by the numerals 56, 58, 78, and 80, are of the computer-controlled type. The operating parameters of such circuits are or may be set and varied by conventional computer software.

System turn command inputs are filtered and scaled in integrated circuit 56 and wheelchair linear (forward/reverse) velocity command inputs are filtered and scaled in integrated circuit 58. For example, the output of sensor 44 can be scaled to correspond one-to-one with that of joystick control 18, though other values are possible. Specifically, at high wheelchair forward velocities the desirable ratio is greater than one, while at slow wheelchair linear speeds the ratio is desirably less than one. IN the case of a one-to-one ratio, the desired turn rate and actual turn rate are substantially the same. Using this method to stabilize the turning performance of a front-wheel drive wheelchair allows the wheelchair to operate at speeds of greater than 7 miles per hour. As an example, when making a right turn at an excessive speed so as to cause a spinout, controller 30 will send a signal to the outside or left drive wheel to slow down as by applying a dynamic or regeneraative braking thereto and optionally by increasing the speed of the right front wheel. Thus, generally through such dynamic or regenerative braking action and/or to a lesser extent by increasing the rotational speed of the remaining drive wheel, power wheelchair stability can readily be maintained.

Further improvements in power wheelchair stability performance are made by including accelerator sensors 48, 50, and 52 as integral parts of the controlled assembly. The additional circuits for signal processing within controller subassembly 30 also include limiter circuits 60 and 62 which respectively limit wheelchair turn rate to below a limit value continuously derived in circuit 80, and limit wheelchair linear deceleration to below a limit value continuously calculated in circuit 78. An equation that has been utilized to calculate the limit value in circuit 78 based on the output signals of acceleration feedback sensors 48 and 50 is:

$$\text{Forward Tilt} = \arcsin e \frac{(\text{Forward Acceleration})}{\sqrt{(\text{Forward Acceleration})^2 + (\text{Vertical Acceleration})^2}}$$

A similar equation for calculating the limit value in integrated circuit 80 using the output signals of acceleration feedback sensors 50 and 52 is:

$$\text{Lateral Tilt} = \arcsin e \frac{(\text{Lateral Acceleration})}{\sqrt{(\text{Lateral Acceleration})^2 + (\text{Vertical Acceleration})^2}}$$

Increase/decrease turn rate circuit 64 and increase forward velocity circuit 66, which circuits are essentially summing circuits, act upon the outputs of circuits 60 and 62 on a comparison basis respectively with the outputs of rate-of-turn sensor 44 and with the hereinafter-identified combined outputs of forward and vertical accelerometer sensors 48, 50, and 52. However, as in the case of rate-of-turn sensor 44, such acceleration sensors need not be installed physically within the confines or enclosure of controller 30 but instead may be remotely installed in wheelchair 10 provided they have proper support and proper installation orthogonal orientation.

By properly securing and orthogonally orienting controller 30 on chassis 12 such sensors function to detect and measure or indicate motorized wheelchair actual accelerations in orthogonal forward/reverse, vertical, and lateral directions, respectively. Front-wheel drive wheelchairs may tip forward if decelerated too quickly. The output from forward/reverse accelerometer 48 can be advantageously utilized by controller 30 to anticipate and limit deceleration to a permissible rate that will ensure that wheelchair 10 will not tip forward when slowing, as for example, on a horizontal surface.

The combination of forward/reverse accelerometer 48 and vertical accelerometer 50 can be used by controller 30 to limit deceleration when going down a hill, slope, ramp, or the like, and such is accomplished using a trigonometric algorithm calculation of actual wheelchair forward inclination or tilt in integrated circuit 78 based on wheelchair forward and vertical actual acceleration values. In other words, controller 30 can place constraints on velocity and deceleration to ensure reliable and safe wheelchair operation through improved motion stability. In particular, top velocity can be limited as a function of a substantially flat surface, or of a slope, or a hill, etc. to establish a desired stopping distance subject to permissible deceleration rate as to prevent forward tipping of the wheelchair.

The inclusion of lateral accelerometer 52 adds the ability to sense lateral movement of wheelchair 10. Thus, the forward accelerometer 48 in combination with lateral accelerometer 52 can be utilized by controller 30 to limit deceleration to a permissible rate as when going around a turn to prevent the wheelchair from spinning-out and/or tipping. Such involves a trigonometric algorithmic calculation of actual wheelchair lateral inclination or tilt based on both lateral and vertical actual acceleration values in digital signal-processor circuit 80. This can be done by placing constraints or limits on velocity, deceleration, turning rate, and the like to ensure reliable operation.

The addition of a vertical accelerometer adds the further ability to sense vertical movement as when moving down a slope, ramp, hill, or the like, thereby allowing controller 30 to place necessary constraints on motion parameters that assure safe and reliable operation against spin-out and/or tipping as on a hill, etc.

Lastly, controller 30 couples and cross-couples combined outputs of controller integrated circuits 64 and 66 at summation circuits 68 and 70, and routes the outputs of integrated circuits 68 and 70 to their respective conventional pulse width modulator circuit 72, 74 for conditioning to a state suitable for driving left and right drive motors 32 and 34.

It should be noted that the present invention automatically corrects for wheelchair veering when the power wheelchair is traversing a sloped surface. For example, joystick control 18 would be calling for a desired turn rate of zero, but the sensor 44 would detect veering and the controller would automatically adjust the differential speed control to compensate for and zero out the veer.

One characteristic of piezoelectric ceramic rate-of-turn sensors is that they have a substantial offset voltage that varies significantly with temperature. In order to accommodate this characteristic, controller 30 attempts to correct for the offset whenever wheelchair 10 is at rest. When wheelchair 10 is at rest, controller 30 averages the output of sensor 44 using, for example, a 2.5 second time constant to determine a correction value for the offset voltage. Then when the wheelchair is in motion, the values provided by sensor 44 are corrected by controller 30 using the correction value.

It should be noted that while two freely-swiveling trailing castors are normally utilized in a power wheelchair, other numbers such as one or three could also be used. Also, though the preferred embodiment uses separate drives for each driven wheel, it is possible to use a single drive that appropriately divides the drive power between the drive wheels with, for example, adjustable clutches.

It should also be noted that with respect to detecting and measuring slopes, inclinations, and tilts, other sensors besides accelerometers could be used, for example, suitable damped pendulum-like sensors.

While the invention has been described with respect to a front-wheel drive power wheelchair, it also is generally applicable to mid-wheel drive power wheelchairs and to rear-wheel drive wheelchairs.

While in accordance with the patent statutes the best mode and preferred embodiment has been set forth, the scope of the invention is not limited thereto, but rather by the scope of the attached claims.

What is claimed is:

1. In a motorized wheelchair assembly, comprising:
   a wheelchair chassis;
   a motor-driven right wheel connected to and providing rolling support for said wheelchair chassis;
   a motor-driven left wheel connected to and providing rolling support for said wheelchair chassis;
   a castor subassembly connected to and providing rolling support for said wheelchair chassis;
   an input device which generates wheelchair chassis turn direction command signals and wheelchair chassis linear velocity command signals in response to wheelchair operator manipulation; and
   a closed-loop controller subassembly receiving command signals from said input device and generating output control signals that regulate the rotational speeds of each of said motor-driven right and left wheels in response to differences between said input device turn direction and linear velocity command signals and detected wheelchair chassis actual turn directions and actual turn rates.

2. The motorized wheelchair assembly invention defined by claim 1, wherein said closed-loop controller subassembly incorporates an angular rate of turn sensor, wherein said closed-loop controller detects signals from said angular rate of turn sensor which correspond to actual turn directions and turn rates of said wheelchair chassis, and wherein said motor-driven right and left wheels are positioned ahead of said castor subassembly in the direction of motorized wheelchair assembly forward motion.

3. The motorized wheelchair assembly invention defined by claim 1, wherein said controller subassembly includes an angular rate-of-turn sensor that is orthogonally supported by said wheelchair chassis, and that detects wheelchair chassis actual turn direction and actual turn rate.

4. The motorized wheelchair assembly invention defined by claim 3, wherein said controller subassembly angular rate-of-turn sensor is a piezoelectric ceramic gyroscope.

5. The motorized wheelchair assembly invention defined by claim 3, wherein said controller subassembly angular rate-of-turn sensor is a rotating gyroscrope.

6. The motorized wheelchair assembly invention defined by claim 3, wherein said controller subassembly angular rate-of-turn sensor is located remote from but in feedback signal-communicating relation with said controller subassembly.

7. The motorized wheelchair assembly invention defined by claim 4, wherein said controller subassembly averages the output feed-back signal of said piezoelectric ceramic gyroscope when said wheelchair assembly is not in motion, and utilizes the average output feedback signal of said angular rate-of-turn sensor as a signal-processing correction value when generating said controller subassembly output control signals.

8. The motorized wheelchair assembly invention defined by claim 1, wherein said controller subassembly further includes forward, lateral, and vertical linear acceleration sensors that are orthogonally supported by said wheelchair chassis and that detect wheelchair chassis actual forward tilt and actual lateral tilt to thereby establish a wheelchair turn rate control limit and a wheelchair linear velocity control limit.

9. The motorized wheelchair assembly invention defined by claim 1, wherein said controller subassembly further includes forward and vertical linear acceleration sensors that are orthogonally supported by said wheelchair chassis and that detect wheelchair chassis actual forward tilt to thereby establish a wheelchair linear velocity control limit.

10. The motorized wheelchair assembly invention defined by claim 1, wherein said controller subassembly further includes lateral and vertical linear acceleration sensors that are orthogonally supported by said wheelchair chassis and that detect wheelchair chassis actual lateral tilt to thereby establish a wheelchair turn rate control limit.

* * * * *